MEMORY MATRIX CONTROL DEVICES

Filed March 3, 1958 5 Sheets-Sheet 1

JAMES J. NYBERG
ALFRED D. SCARBROUGH
INVENTORS

BY [signature]

ATTORNEY

MEMORY MATRIX CONTROL DEVICES

Filed March 3, 1958 5 Sheets-Sheet 2

JAMES J. NYBERG
ALFRED D. SCARBROUGH
INVENTOR.

BY [signature]

ATTORNEY

MEMORY MATRIX CONTROL DEVICES

Filed March 3, 1958 5 Sheets-Sheet 3

JAMES J. NYBERG
ALFRED D. SCARBROUGH
INVENTORS

BY [signature]

ATTORNEY

JAMES J. NYBERG
ALFRED D. SCARBROUGH
INVENTOR.

BY [signature]

ATTORNEY

JAMES J. NYBERG
ALFRED D. SCARBROUGH
INVENTORS
BY [signature]
ATTORNEY

United States Patent Office 3,015,091

Patented Dec. 26, 1961

3,015,091

MEMORY MATRIX CONTROL DEVICES

James J. Nyberg, Torrance, and Alfred D. Scarbrough, Palos Verdes Estates, Calif., assignors, by mesne assignments, to Thompson Ramo Wooldridge Inc., Cleveland, Ohio, a corporation of Ohio Filed Mar. 3, 1958, Ser. No. 718,896
15 Claims. (Cl. 340—174)

This invention relates to memory matrix control devices and, more particularly, to selection and sequence control circuits for operating a magnetic core matrix memory as a delay device or circulating register.

Extensive progress has been made during the last ten years in the development of the so-called random access memory, a particular form of which is the magnetic core matrix system such as is described in an article by Jay W. Forrester in the Journal of Applied Physics, January 1951, page 44, entitled "Digital Information Storage in Three Dimensions Using Magnetic Cores."

Much of the work done during this period has been directed towards solving the problem of avoiding spurious memory output signals due to the non-uniform characteristics of the storage elements therein. In the magnetic core matrix this results from the effect of a non-rectangular B-H loop in the core material used and due to the difference between core hysteresis characteristics. The result of this situation is that signals are generated to some extent even by non-selected cores and must be eliminated from the output signal. Several solutions have been provided for this problem, typical patents being: Rajchman 2,691,154; Saltz 2,691,156; Rosenberg 2,709,248; Rosenberg 2,712,126; Person 2,719,965; Ashenhurst 2,724,103; Minnick 2,723,542; Rajchman 2,776,419; Mestre 2,800,643; and Stuart-Williams 2,802,203.

In addition to providing several solutions to the reading and writing problems inherent in operating a magnetic core matrix, the prior art has also provided various means for accomplishing the high speed selection of cores through the so-called magnetic core switch. Typical patents illustrative of these developments are found in: Stuart-Williams 2,691,152; Rajchman 2,691,153; Rosenberg 2,691,155; Stuart-Williams 2,691,157; Rajchman 2,734,187; and Rajchman 2,768,367.

The development of matrix memories to date, however, has not provided a memory which is efficiently adapted for employment in a serial digital computing system where binary information must be operated upon during successive digit time intervals. In this type of system one or more circulating registers are utilized for storing numerical operands or sometimes for the temporary storage of coded instruction signals indicating an operation to be performed. The conventional matrix memory control arrangement is not well adapted to provide the desired serial writing and reading of signals since they have been designed for the much more complicated problem of random selection. As a result, the conventional matrix memory arrangement is not conveniently adapted for automatic recirculation of binary signals pending receipt of new input information.

The present invention, on the other hand, obviates the complexities of the conventional random access matrix memory system in providing a control technique which permits automatic recirculation of information in a serial manner whenever there is no new information to be entered into the memory. Furthermore, the invention teaches a considerable simplification in the reading and writing control which is necessary to accomplish the desired serial recirculation.

According to one concept of the invention, reading and writing selections are controlled separately for different storage elements and the selection operation is sequenced in a manner so that information is read from a particular storage element after a number of digit time intervals, following the writing of information therein, corresponding to the desired recirculation or delay time. It will be understood in the discussion which follows that the invention is equally applicable to delay operation or recirculation. In the delay case, the output information is not returned to the memory, whereas in the recirculation case it is.

In one embodiment of the invention, reading and writing switches are interconnected for alternate operation in sequence. The writing switches are connected in a different manner to the matrix than the reading switches so that each core is written into during a different time interval than it is read. In a particular case, for example, a matrix in the form:

| | |
|---|---|
| A | B |
| C | D |
| E | F |

is controlled in the following writing sequence: A, D, E, B, C and F. The reading sequence, on the other hand, is: B, C, F, A, D and E. This means that the delay between writing into and reading from any core is three time intervals, where each interval is utilized for both writing and reading.

The same matrix array may be operated in any of a plurality of sequences, such as: writing sequence—F, A, D, E, B and C and reading sequence—D, E, B, C, F and A, for a delay of four time intervals. It will be understood, of course, that the invention is not limited to the simple examples described herein but may be expanded to any desired delay or circulating length desired. Furthermore, it will be apparent in the description which follows that the use of any given matrix array according to the invention permits any variation of delay or circulating length up to the full capacity of the matrix.

According to another concept of the invention, the reading and writing selection is made through the use of X and Y selection control devices which have cycles without any common factors between them. Thus the X selection cycle may include two time intervals and the Y selection cycle three time intervals. It will be shown further that the matrix may be operated with X and Y selection cycles having one or more common factors to provide a plurality of different delay means. Thus an X cycle of four and a Y cycle of six may be employed to drive a four by six matrix in two different delay cycles, each of which utilizes 12 storage elements in the matrix. It will be noted that the writing cycle above: A, D, E, B, C and F results from a Y drive cycle of three starting with element A, and an X drive cycle of two starting with element A. The reading cycle is similar starting with element B.

In addition to the novel writing and reading sequence technique of the invention, an improved input-output concept is introduced. According to the conventional approach, the memory matrix is read at the beginning of a digit time interval, generally by setting the selected storage element (core) to a zero state and sensing any signal change resulting therefrom. The signal detected during the reading cycle is retained and re-entered into the same storage element if no new information is to replace it. This conventional approach requires separate input circuits, one for replacing signals read from the matrix (see lines 23–25 in column 2 of U.S. Patent No. 2,691,155) and the second for receiving new input signals.

This duplication of input circuits for recirculation and input is avoided according to the present invention by changing the operation during each digit time interval so that writing is performed first to enter either the previously read out matrix signal or a new input signal, and then the second portion of each digit time interval is employed to read out from the matrix to the input circuit as well as to detect the state of the input signal. Provision is made in the input circuit to make the input signal "override" the output signal read from the matrix. This may be accomplished in a simple manner by sampling the input signal after sensing the matrix output signal to use the input signal as the controlling signal if it is present, otherwise to re-enter the output signal.

In one embodiment of this technique, a flip-flop or bistable storage element is employed in the input circuit to receive the output signal from the matrix and input signals. The state of the flip-flop is sensed during the beginning of each interval and a signal is generated to drive the selected storage element in the matrix to a corresponding state. If the storage elements are read by re-setting to zero during each cycle, writing therein is accomplished by turning the element on or setting to binary one if the flip-flop is in the on or one state, and by not sending a signal to the matrix if the flip-flop is off or in the zero state.

During the second portion of each digit time interval, the flip-flop is first set to a state corresponding to the signal read from the selected storage element in the matrix. The flip-flop remains in this state if no input signal is present, otherwise it is set to the state of the input signal. In this manner a simplified input logic is possible since no control logic is required to cause the matrix memory to recirculate information therein because of the predetermined read-write delay discussed above. Thus the input logic for the flip-flop need only contain signals indicating that a change in the state of a stored signal is required.

Accordingly it is an object of the present invention to provide improved means for controlling a memory matrix to permit the serial reading and writing of information.

Another object is to provide a simple reading and writing sequence control circuit for a memory matrix.

A further object is to provide a memory matrix control circuit which is readily adapted for operation as a circulating register or delay device.

Still another object of the invention is to provide an input-output circuit for a memory matrix which requires only a simple input circuit for both the recirculation of information and the entry of new information.

A specific object of the invention is to provide a magnetic core matrix which is efficiently mechanized for use in a serial computing system.

Another specific object is to provide a magnetic core matrix which may be controlled for the reading and writing of information through a single flip-flop, permitting a simplification of the input logic required.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

FIG. 1 is a block diagram of one embodiment of the present invention;

FIGS. 2*a* and 2*b* illustrate two forms of sequence arrangements for the embodiment of FIG. 1;

Figure 1:
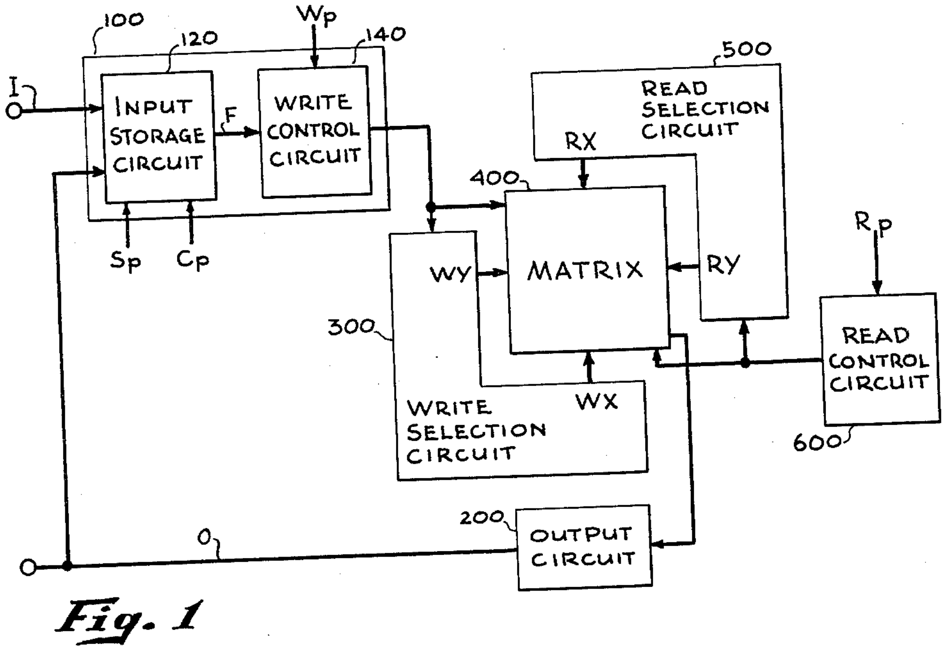

Reference is now made to FIG. 1 wherein one embodiment of the present invention is illustrated in block diagram form. As indicated in FIG. 1, an input circuit 100 receives input signal I as well as output signals O produced by output circuit 200. Input circuit 100 drives a write selection circuit 300 as well as a matrix 400. Matrix 400 is also controlled by a read selection circuit 500, which receives control signals produced by a read control circuit 600. The operation of read control circut 600 causes output signals to be read from matrix 400 to output circuit 200, producing signals O.

In one illustrative form, input circuit 100 may include an input storage circuit 120, such as a flip-flop, and a write control circuit 140. The input storage circuit retains the recirculated or input information for one digit time interval, that is, it provides a single binary digit delay. It will be noted that write selection circuit 300 includes two sections referenced as WX and WY controlling X and Y write selection leads of matrix 400, respectively, and that read selection circuit 500 includes two sections RX and RY controlling the X and Y read selection leads of matrix 400, respectively.

Figure 2A:
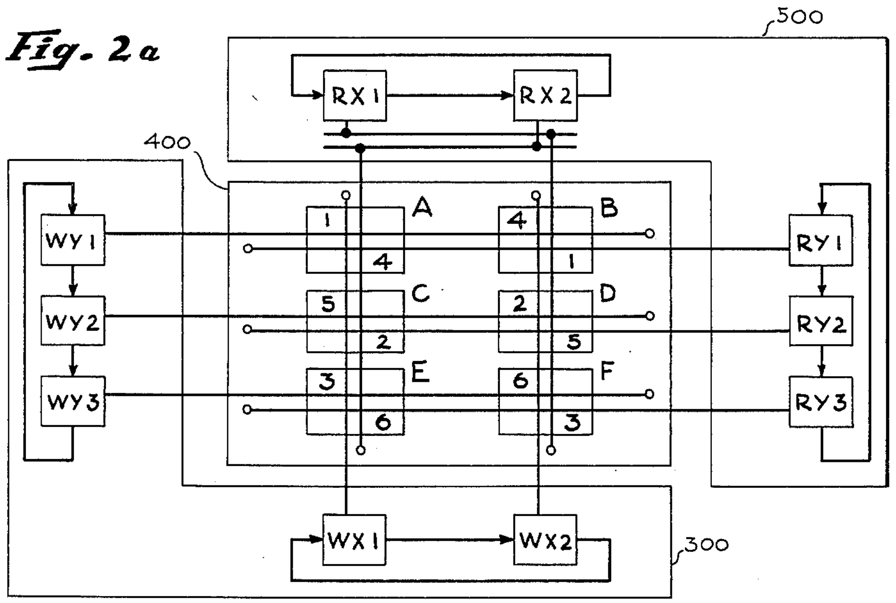
Figure 2B:
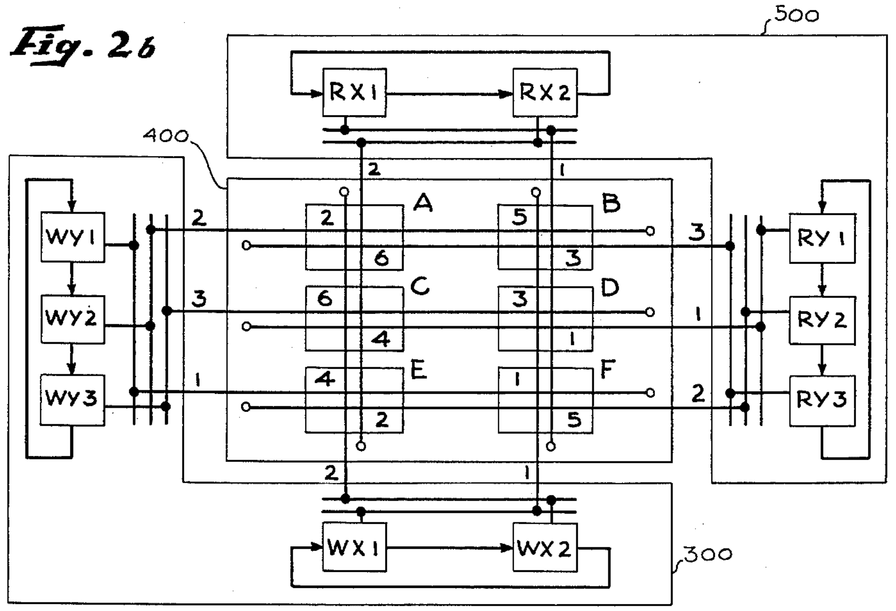

The novel selection operation of the invention can best be explained by reference to the examples of FIGS. 2*a* and 2*b*, FIG. 2*a* being considered first. In FIG. 2*a*, section WY of write selection circuit 300 is shown as including switches WY1, WY2, and WY3 arranged for sequential operation starting with switch WY1. Section WX is shown as including switches WX1 and WX2 also arranged for sequential operation. In a similar manner sections RX and RY of read selection circuit 500 are shown as including switches RX1, RX2 and RY1, RY2, and RY3.

The wiring of matrix 400 is shown with reference numbers at each storage element position to indicate the sequence of operation. At position A, the number 1 is noted in the upper left-hand corner of the square and the number 4 is noted in the lower right-hand corner. This is intended to indicate that this storage element is written into during the first sequence interval of the writing cycle and read during the fourth sequence interval of the reading cycle. This is accomplished by starting the writing sequence with switches WX1 and WY1 turned on, whereas the reading sequence is either started with switches RX2 and RY1 on, or is connected as indicated in FIG. 2*a* with the X matrix lead connections to switches RX1 and RY1 reversed with respect to the connections to switches WX1 and WY1.

Thus in the arrangement illustrated in FIG. 2*a*, the writing selection sequence proceeds in the order: A, D, E, B, C and F as indicated by the numbers 1 through 6 in the upper left-hand corners of the respective storage element positions; and the reading selection sequence proceeds in the order: B, C, F, A, D and E as indicated by the numbers 1 through 6 in the lower right-hand corners of the respective storage elements.

An entirely different sequencing can be obtained with the structure of FIG. 2*a* by simply changing the connections to the matrix. One variation is illustrated in FIG. 2*b*. In this case the connection between switching elements WX1 and WX2 are reversed to the matrix, and the Y leads of the matrix are connected to the switches in WY in the order 2, 3, and 1. The X read leads are connected in the order 2 and 1, and the Y read leads are connected in the order 3, 1, and 2. This results in a storage element write sequence as follows: F, A, D, E, B and C and a read sequence: D, E, B, C, F and A.

It will be noted in the sequence of operation for the arrangement of FIG. 2*a* that core A is not read until three time intervals after it is selected for writing. This then provides a delay of three intervals. In the discussion which follows it will be seen that an additional delay occurs in the passage of signals through the input circuit so that the total delay can be computed as the difference betwen the writing and reading selection numbers plus one. Thus the arrangement of FIG. 2*b* provides a delay of 6−2+1 or 5 as may be observed by examining the reference numbers for storage element position A.

It will be understood that the invention is not limited to the use of reading and writing sequences which are the same. An interesting variation may be shown as follows:

| | | | |
|---|---|---|---|
| A | 6/5 | B | 3/2 |
| C | 2/3 | D | 5/6 |
| E | 4/1 | F | 1/4 |

In this example: the writing sequence is—F, C, B, E, D and A and the reading sequence is—E, B, C, F, A and D. It will be noted then that each storage element position is read after a different delay.

In the above examples, the X drive sequences in two intervals and the Y drive sequences in three intervals. These two sequences have no common factors and consequently all of the elements of the matrix are selected. It is possible to employ the invention, however, with more than one basic sequence where the X and Y drive sequences do have a common factor. Consider, for example, the case where the X drive cycles in four intervals and the Y drive in 6 as follows:

| | | | | | | | |
|---|---|---|---|---|---|---|---|
| A | 1/9 | B | *a*/*i* | C | 7/3 | D | *g*/*c* |
| E | *h*/*d* | F | 2/10 | G | *b*/*i* | H | 8/4 |
| I | 9/5 | J | *i*/*e* | K | 3/11 | L | *c*/*k* |
| M | *d*/*l* | N | 10/6 | O | *j*/*f* | P | 4/12 |
| Q | 5/1 | R | *e*/*a* | S | 11/7 | T | *k*/*g* |
| U | *l*/*h* | V | 6/2 | W | *j*/*b* | X | 12/8 |

Here there are two different write sequences:

| | 1 | 2 | 3 | 4 | 5 | 6 | 7 | 8 | 9 | 10 | 11 | | 12 |
|---|---|---|---|---|---|---|---|---|---|---|---|---|---|
| (1) | A, | F, | K, | P, | Q, | V, | C, | H, | I, | N, | S | and | X |
| | *a* | *b* | *c* | *d* | *e* | *f* | *g* | *h* | *i* | *j* | *k* | | *l* |
| (2) | B, | G, | L, | M, | R, | W, | D, | E, | J, | O, | T | and | U |

And two different read sequences:

| | 1 | 2 | 3 | 4 | 5 | 6 | 7 | 8 | 9 | 10 | 11 | | 12 |
|---|---|---|---|---|---|---|---|---|---|---|---|---|---|
| (1) | Q, | V, | C, | H, | I, | N, | S, | X, | A, | F, | K | and | P |
| | *a* | *b* | *c* | *d* | *e* | *f* | *g* | *h* | *i* | *j* | *k* | | *l* |
| (2) | R, | W, | D, | E, | J, | O, | T, | U, | B, | G, | L, | and | M. |

This arrangement may, therefore, be operated as two separate circulating registers in the same matrix array, the selection of register being made by starting the sequencing devices at the proper points.

Figure 3:
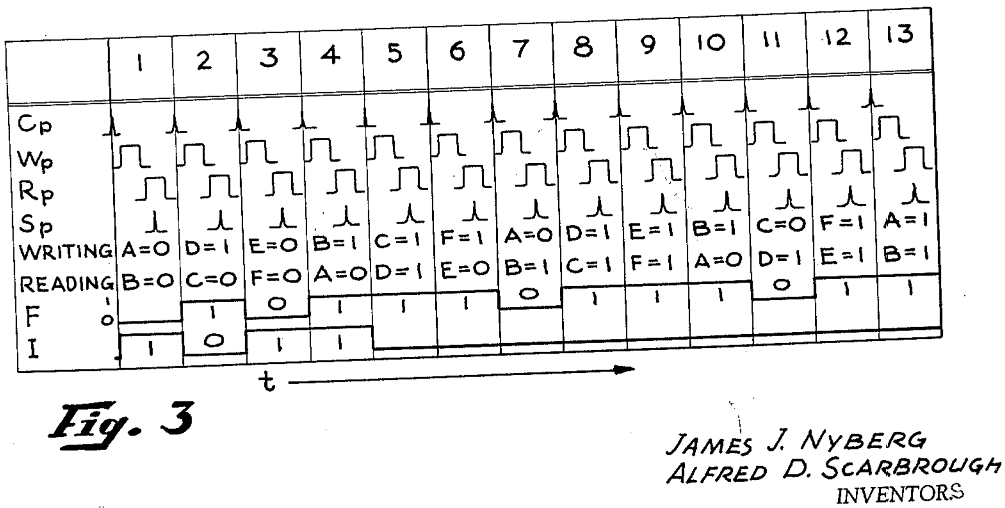
FIG. 3 is a composite set of waveforms and signals illustrating a typical operation of the embodiment of FIG. 1.

An illustrative operation of the embodiment of the invention shown in FIGS. 1 and 2*a* will now be considered with reference to the waveforms and signals in FIG. 3. It will be noted in FIG. 3 that pulses *Cp* occur at the beginning of each of the time intervals 1 through 13. In FIG. 1 these pulses are shown as applied to input storage circuit 120.

Writing pulses *Wp* of longer duration than pulses *Cp* are shown in FIG. 3 as occurring during the first half of each time interval and are employed to actuate write control circuit 140, shown in FIG. 1. The duration of these pulses is selected to permit the changing of the state of a selected storage element in accordance with the state of input storage circuit 120.

Reading pulses *Rp* of a duration similar to pulses *Wp* may be observed to occur at the end of each time interval shown in FIG. 3. These pulses actuate read control circuit 600 of FIG. 1 and are of a sufficient duration to reset all storage elements.

Sampling or strobe pulses *Sp* are shown as occurring during respective pulses *Rp* and are employed to enter the signal read from matrix 400 through output circuit 200 into input storage circuit 120.

In the operation which is illustrated in FIG. 3, the input signal is the binary number 1 0 1 1, successive binary digits occurring during time intervals 1, 2, 3, and 4, respectively. A binary digit time delay is employed to enter the input number into input circuit 120 which produces a corresponding output signal series 1 0 1 1 during time intervals 2, 3, 4, and 5, respectively. In this operation it is pulses *Cp* which are effective to enter the information into the input circuit, particular circuit means for doing this not being shown since such are now well known in the art.

At the beginning of the operation illustrated, storage elements A and B are in zero states. The zero in element B is not shown as entered into input circuit 120 since the input signal I is in the one state and effectively overrides it. During the second time interval, element D receives a signal corresponding to the state of signal F—the delayed input signal I. This occurs at the beginning of the time interval in response to signal *Wp*. At the end of the second interval the state of element C is read in response to pulse *Rp* and sampled for input into circuit 120 by pulse *Sp*.

The operation just discussed continues in a similar manner until the signal series 1 0 1 1 of input signal I is entered into elements D, E, B and C during time intervals 2, 3, 4, and 5, respectively. After this, the input signal I is zero so that the system automatically recirculates the information entered in the following manner:

During time interval five, the input signal I is zero but element D is read to be a one. Consequently, signal F appears as a one during the next interval 6. In a similar manner, elements E–0, B–1 and C–1 are read into the input circuit at the end of inetrvals six, seven and eight. It will be noted that the number 1 0 1 1 appears in signal F during the intervals 6, 7, 8 and 9, respectively, constituting an effective recirculation of the input signals I of intervals 2, 3, 4 and 5. The delay inherent in the system will be noted to be four digit time intervals, three of which occur in the matrix selection sequence and the fourth of which is the digit delay inherent in the input circuit.

Figure 4:
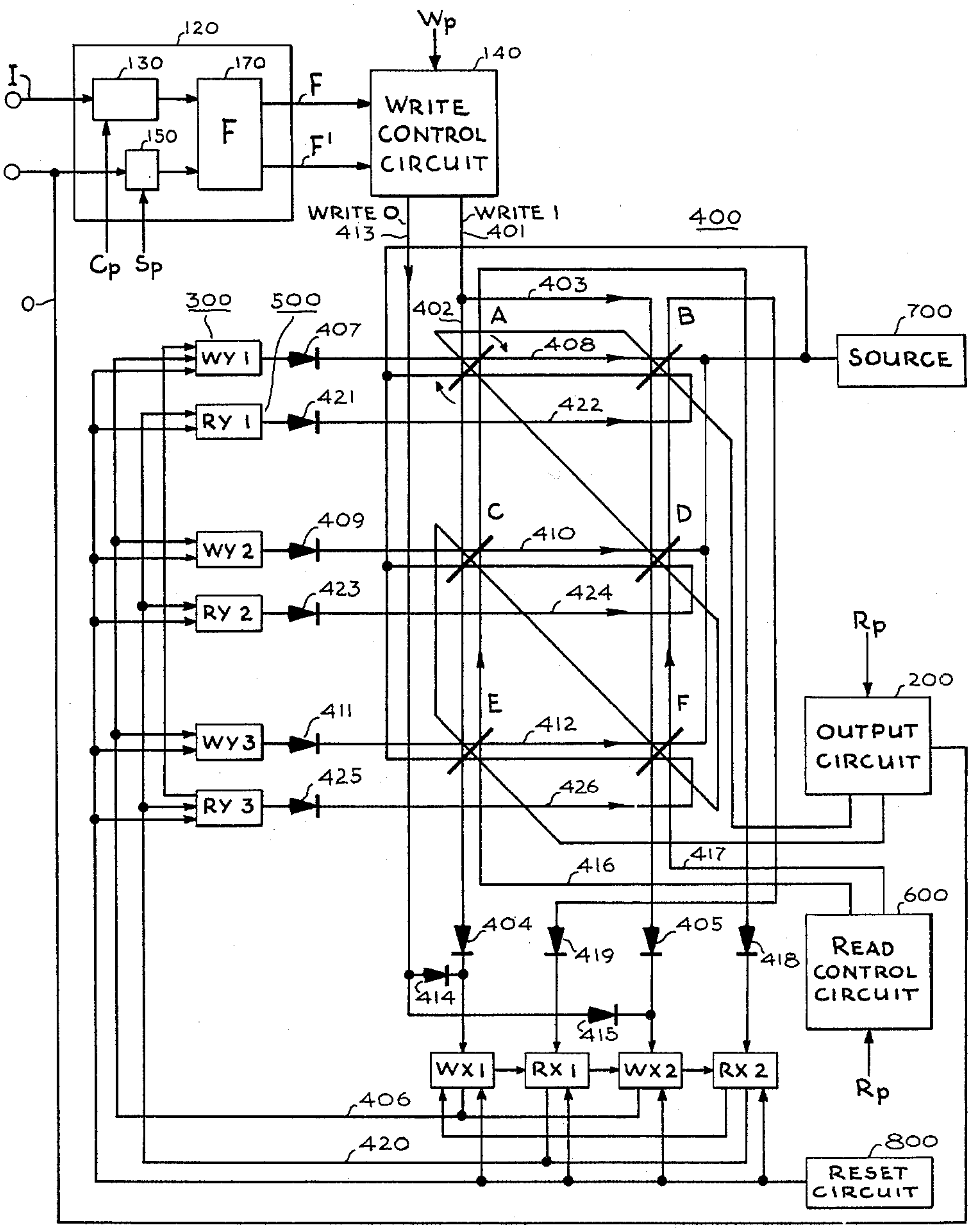
FIG. 4 illustrates a control arrangement according to the present invention which is suitable for a magnetic core matrix.

A particular arrangement of the invention adapted for use with magnetic cores is shown in FIG. 4. Further details of input circuit 120 are also shown here, such that gating circuits 130 and 150 are employed to enter signals I and 0 into a flip-flop 170 under control of pulses *Cp* and *Sp*, respectively. The flip-flop produces complementary output signals F and F′ which are applied to write control circuit 140.

The switches of write selection circuit 300 and read circuit 500 are interconnected into X and Y ring counters or shifting registers which may be of the preferred type shown in FIGS. 5*a* and 5*b*, discussed below. In particular, switches WY1, RY1, WY2, RY2 WY3, RY3 and WY1 are connected in a ring in that order and switches WX1, RX1, WX2, RX2 and WX1 are connected in that order.

Matrix 400 receives a write binary 1 signal via lead 401 connected to control circuit 140. Lead 401 branches into leads 402 and 403 which run through respective columns of the magnetic cores constituting the storage elements in the matrix. Lead 402 is connected to a diode 404 biased to pass current to writing switch WX1. Lead 403 is connected to diode 405 which is biased to pass current to switch WX2. The column selection is made through the appropriate switch and the current passing therethrough proceeds from lead 406 to switches WY1, WY2 and WY3. The switch which is operative at that time passes current through an associated diode, such as diode 407 connected to switch WY1, and thence to a row lead of matrix 400, such as lead 408. In a similar manner, switch WY2 passes current through diode 409 to matrix lead 410 and switch WY3 passes current through diode 411 to matrix lead 412.

The current passed through either of leads 408, 410 or 412 passes therefrom to a source 700.

In this manner, a core is selected and driven into a 1 state by the completion of a double loop of current around the desired core, shown as an illustration to be wound in a clockwise direction. That is, the core in position A receives driving current which passes through leads 402, 406 and 408 to source 700.

If a zero is to be written into a core, matrix 400 is bypassed. In this case, however, actuating current must still be sent through the switches in order to accomplish the desired sequencing, a typical operation being described below with respect to FIGS. 5a and 5b. In this case, write 0 lead 413 passes current through diode 414 and switch WX1 to lead 406 or through diode 415 and switch WX2 to lead 406. Current then passes through the selected switch in the group WY1, WY2 and WY3 and one of leads 408, 410 or 412 to source 700. The current in this case does not actuate any selected core.

During the reading sequence, current passes from read control circuit 600 in response to pulse Rp through matrix 400 in a direction opposite to the current direction for writing a 1. Thus leads 416 and 417 pass current in the opposite direction from leads 402 and 403. Lead 416 passes current through diode 418 to switch RX2 and lead 417 passes current through diode 419 to switch RX1. It will be noted here that the leads are interchanged in order to provide the sequencing operation described above with respect to FIG. 2a.

The current passed through either of switches RX1 or RX2 is then passed through lead 420 to switches RY1, RY2 and RY3. Switch RY1, if operating, passes current through diode 421 to lead 422 which will be noted to pass current in a direction opposite to that passed by lead 408. In a similar manner, switch RY2 passes current through diode 423 to lead 424 and switch RY3 passes current through diode 425 to lead 426. Any current passed in this manner is derived through the same source 700. In this manner any core may be selected in matrix 400 to be reset to zero.

In addition to the circuits shown in the embodiment of FIG. 1, a reset circuit 800 is shown in FIG. 4 for initally setting the switches so that switches WX1 and WY1 are operative to pass current. Thus during the first writing operation, core A is selected and may be set to a one state if lead 401 receives current. The current passed through the switches during this portion of the time interval (determined by the currents of pulse Wp) also causes switches RX1 and RY1 to be turned on so that reading current passed through matrix 400 in the manner described above will actuate core B. The reading current also actuates switches WX2 and WY2 so that the next core selected for writing is core D. This sequence is continued in the manner described above with respect to FIG. 2a with each writing operation causing the actuation of the next reading switch and each reading operation causing the actuation of the next writing switch.

Figure 5A:
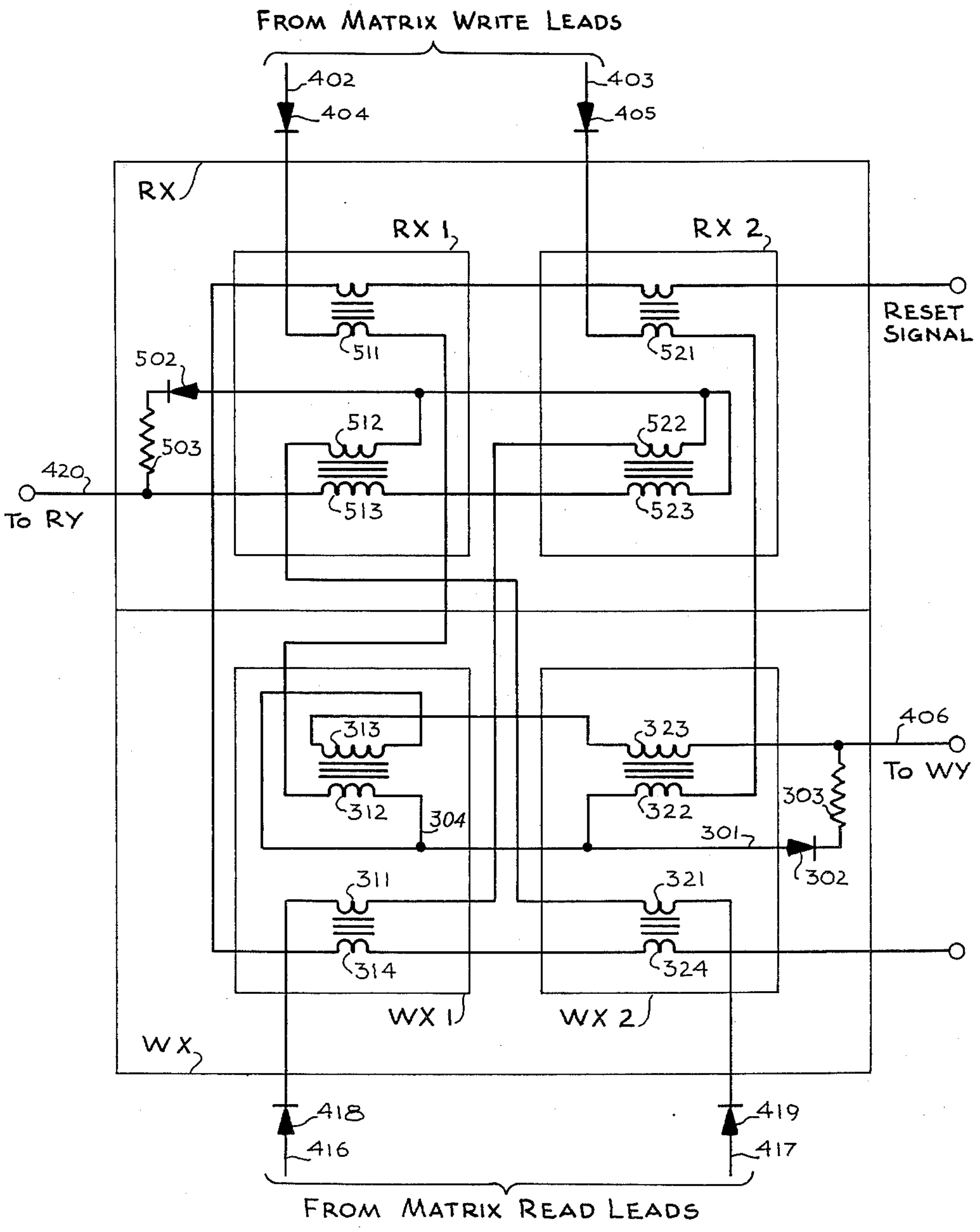
FIGS. 5*a* and 5*b* are schematic diagrams of suitable circuits for the X and Y selection control devices of FIG. 4.
Figure 5B:
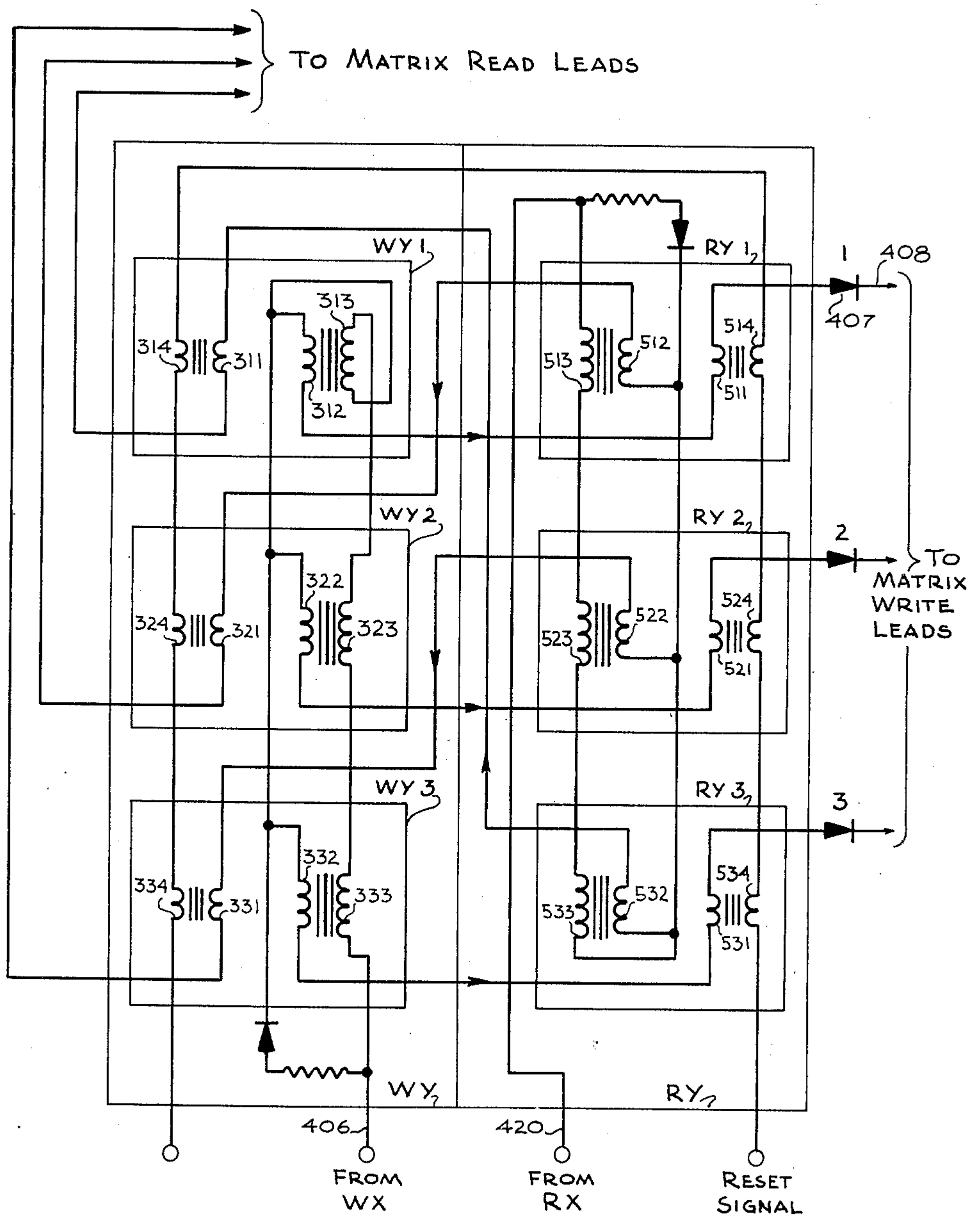

One suitable arrangement for the ring counter arrangement of switches shown in FIG. 4 is illustrated in schematic detail in FIGS. 5a and 5b. Refering first to FIG. 5a, it will be noted that matrix lead 402 passes current through diode 404 as previously noted and thence to a setting winding 511 in switch RX1. This is effective to turn on switch RX1 so that it will pass current during the following reading interval. Current passed through winding 511 goes thence through secondary winding 312 in switch WX1. This winding surrounds a saturable core which may be similar to those used in matrix 400. It will be assumed that switch WX1 has been initially set to a state such that when current is drawn through primary winding 313—to source 700—the saturation state of the core is reversed, drawing current through the secondary winding 312 and lead 402, controlling the selection of the corresponding row in matrix 400. The same current is also drawn through switches WY1, WY2, and WY3 which are coupled to output lead 406, shown in FIG. 5a. It will be noted that current may pass through either of two paths in going through winding 312, one proceeds through lead 304 to diode 302 and resistor 303, and thence to output lead 406, and the other through lead 304 and winding 313 to output lead 406. This provision is made so that the current passing through winding 313 may be adjusted to insure the desired switching time.

At the end of the first operating interval, reading current passes through lead 417 and diode 419 to setting coil 321 in switch WX2 and thence to winding 512 actuating the saturable core in switch RX1. Current passes then through transformer winding 513 to output lead 420 and thence to switches RY1, RY2 and RY3. Diode 502 and resistor 503 serve the same purpose as diode 302 and resistor 303 described above.

During the next time interval of operation, writing current passes through lead 403 and diode 405 to setting winding 521 of switch RX2 and thence to winding 322 actuating the saturable core of switch WX2 sending current through lead 406 to switches WY1, WY2 and WY3. Finally reading current passed through lead 416 and diode 418 passes through setting coil 311 in switch WX1 and actuates winding 522 in switch RX2 to send current through lead 420 to switches RY1, RY2 and RY3.

The operation of the circuit of FIG. 5b is similar to that of FIG. 5a and should be apparent from the previous example. The same reference numbers are used for the windings so that corerspondence in operation may be noted. For example, it is assumed that switch WY1 is initially set with its saturable core in a state such that current passed through input lead 406 and winding 313 causes the triggering of the switch and current to pass thence through winding 312 in switch WY1 to setting winding 511 in switch RY1 and thence through diode 407 to matrix write lead 408. The next reading current passed through lead 420 actuates winding 513 in switch RY1 triggering the switch and then sending current to setting coil 321 in switch WY2. This sequence is continued from write to read and so forth in ring counting fashion.

From this description it should readily be apparent that the present invention provides a simple circuit for controlling the selection of storage elements in a memory matrix such that information may be read in serial order. It should now be clear that the memory matrix can easily be operated as a circulating register having any length up to the maximum capacity of the memory or to provide a predetermined delay.

Furthermore it has been shown that the novel technique of writing before reading during each digit time interval permits a simplified input logic. The reason for this, as more fully discussed above, is inherent in the use of the input circuit to retain a signal representing the previous state of the register if no new input information is to be entered.

Therefore, it is possible to operate embodiments of the present invention so that recirculation is performed automatically whenever no new input signals are applied to the circuit.

What is claimed is:

1. An input-output arrangement for a memory matrix including a plurality of memory elements selectively actuable to assume one of two storage states through a grid selection network, said arrangement comprising: horizontal and vertical write sequence control circuits; horizontal and vertical read sequence control circuits; an input circuit including a one digit delay storage device; an output circuit; means for coupling said input circuit to said memory matrix to write a signal therein, in the selected element, according to the signal of said input circuit; means for coupling said output circuit to said memory matrix for receiving the signal of an element selected for reading; and control means for actuating said write and read sequence control circuits to operate said memory matrix to enter the selected storage element signal into said storage device at the end of the corresponding digit time interval and then to write the signal entered into said storage device in said memory matrix in the selected element at the beginning of the next interval, recirculation of digit information being thereby accomplished without changing the state of said storage device during a writing interval.

2. The arrangement defined in claim 1 wherein said input circuit includes means for receiving a signal $Sp$ for entering any signal read through said output circuit into said storage device, includes means for receiving a signal $Cp$ for entering an external input signal into said storage device, and includes means for receiving a signal $Wp$ for transferring the signal in said storage device to said matrix; and wherein said means coupling said output circuit to said matrix includes means for receiving a reading signal $Rp$; said signal $Sp$ occurring with the period of signal $Rp$ at the end of a digit time interval, signal $Cp$ occurring after signal $Sp$ and marking the beginning of a digit time interval, and signal $Wp$ occurring during the beginning portion of a digit time interval.

3. A circulating register comprising: a two-dimensional matrix including storage elements at intersecting X and Y selection leads; a first shifting register having elements connected to said X leads, respectively; a second shifting register having elements connected to said Y leads, respectively; a writing selection control circuit for sequentially and simultaneously actuating an element in each of said first and second registers to select series of storage elements; a third shifting register having elements connected to said X leads, respectively; a fourth shifting register having elements connected to said Y leads, respectively; and a reading selection control circuit for sequentially and simultaneously actuating an element in each of said third and fourth registers, the sequential actuation of said first and second register elements selecting said storage elements so as to precede the selection of the same core by the action of said reading control circuit by a number of sequencing steps corresponding to the desired length of said circulating register.

4. Means for operating a matrix memory, including a plurality of selectively actuable storage elements, as a circulating register, said means comprising: a first series of stepping switches for selecting the storage elements in a column of said memory for writing; a second series of stepping switches for selecting the storage elements in a row for writing; a third series of stepping switches for selecting storage elements in a column for reading; a fourth series of stepping switches for selecting storage elements in a row for reading; a writing control circuit for producing input signals for said first and second series of stepping switches, said writing circuit being connected to said storage elements so as to change the row and column for writing for each new selection of storage element; and a reading control circuit for producing signals to detect the states of said storage elements, said reading control circuit being connected to said storage elements so as to select a different row and column for each detection of the state of a storage element, the sequence of detection of said read control circuit being such that input signals are entered into each storage element prior to detection by an amount of sequencing steps equal to the desired circulating time of said circulating register.

5. The means defined in claim 4 wherein said rows and columns of storage elements contain numbers of elements without any common factor, and said reading sequence follows said writing sequence by a number of steps corresponding to the total number of storage elements.

6. The means defined in claim 4 wherein said first and third series of stepping switches are connected together so that each writing step is followed by a reading step to control the selection of a column in said memory, and said second and fourth series of stepping switches are connected together to receive respective signals from the interconnected series of said first and third series of stepping switches, to select the corresponding rows in said memory for writing and then reading.

7. The means defined in claim 4 wherein said first and third series of stepping switches are cycled in a sequence of steps totaling a number including the factor two and said second and fourth series of stepping switches are cycled in a sequence of steps totaling a number including the factor three but not the factor two.

8. The means defined in claim 4 wherein said matrix memory includes storage elements A, B, C, D, E and F, said first and second series of stepping switches being operable to select said storage elements for writing in the sequence A, D, E, B, C, and F, and said third and fourth series of stepping switches being operable to select said storage elements for reading in the sequence B, C, F, A, D, and E.

9. The means defined in claim 4 wherein said matrix memory includes storage elements A, B, C, D, E, and F; said first and second series of stepping switches being actuated to select said storage elements for writing in the sequence F, A, D, E, B, and C; and said third and fourth series of stepping switches being actuated to select said storage elements for reading in the sequence D, E, B, C, F, and A.

10. A cyclical memory system comprising: a matrix including X and Y grids for selecting storage elements therein; a plurality of switching elements WX for selecting X grids, respectively for writing; a plurality of switching elements WY for selecting Y grids for writing, respectively; a plurality of switching elements RX for selecting X grids for reading, respectively; a plurality of switching elements RY for selecting Y grids for reading, respectively; writing sequence means for passing energy through the series connection of one element WX and one element WY for each writing sequence step and for causing the cycling from one writing series pair to the next to provide a writing circuit path through each storage element in a predetermined sequence; and reading sequence means for resetting said storage elements to a predetermined state to determine the information condition therefor, said reading sequence means being arranged to provide a circuit through one element RX and one element RY in series for each step of said predetermined sequence to select a storage element for reading after writing therein following a predetermined number of sequence steps corresponding to the desired cycle of said memory.

11. The system defined in claim 10 wherein the elements of WX and RX are caused to provide sequencing for writing and reading at a first cyclic rate and elements of WY and RY are caused to provide sequencing for writing and reading at a second cyclic rate, there being no common factors between the first and second cyclic rates.

12. The system defined in claim 11 wherein said first cyclic rate includes a number of steps having the factor two and said second cyclic rate includes a number of steps having the factor three, said first cyclic rate not including the factor three and said second cyclic rate not including the factor two.

13. In a memory system wherein a storage element in a matrix is selected by interconnecting an associated switching element in a selection circuit WX and an associated switching element in a selection circuit WY for writing, and through an associated switching element in a selection circuit RX interconnected with an associated switching element in a selection circuit RY for reading, a device for entering binary digits into, and reading binary digits from the selected storage elements in said matrix, said device comprising: an input circuit including means for receiving and storing output signals read from said matrix, or input signals, said input circuit producing a stored signal corresponding to an applied input signal if such occurs or to said output signal, means for writing the binary signal stored in said input circuit into the selected element in said matrix at the beginning of the digit time interval following the entry of the binary signal into said input circuit; and an output circuit for reading the binary signal from a selected storage element to produce a corresponding output signal at the end of a digit time interval.

14. An arrangement for controlling the storage element selection in a memory matrix comprising: a first set of selection devices for actuating row leads, respectively, in said matrix, said first set of devices including a first series of switches for controlling the passage of writing current into said row leads and a second series of switches for controlling the passage or reading current into said row leads; a second set of selection devices for actuating column leads, respectively, in said matrix, said second set of devices including a third series of switches for controlling the passage of writing current into said column leads and a fourth series of switches for controlling the passage of reading current in said column leads; and control means for interconnecting one of the switches of said first series with one of the switches of said third series for each sequence step of writing and for interconnecting one of the switches of said second series with one of the switches of said fourth series for each sequence step of reading, said control means being operative to pass reading and writing current to said matrix in alternate sequence steps so that selected elements are read following a desired number of sequencing intervals after the corresponding element has been selected for writing into.

15. The arrangement defined in claim 14 wherein said first and third series of switches and said second and fourth series of switches are interconnected for actuation by said control means as shifting registers wherein the switches of said first set of devices are used to turn on switches of said second set of devices to cause the sequencing from writing to reading and switches of said second set of devices are used to turn on switches of said first set of devices to cause the sequencing from reading to writing.

References Cited in the file of this patent

UNITED STATES PATENTS

| | | |
|---|---|---|
| 2,700,150 | Wales | Jan. 18, 1955 |
| 2,802,203 | Stuart-Williams | Aug. 6, 1957 |
| 2,825,890 | Ridler et al. | Mar. 4, 1958 |

UNITED STATES PATENT OFFICE

CERTIFICATE OF CORRECTION

Patent No. 3,015,091 December 26, 1961

James J. Nyberg et al.

It is hereby certified that error appears in the above numbered patent requiring correction and that the said Letters Patent should read as corrected below.

Column 5, line 27, for "G b/i" read -- G b/j --; column 6, line 28, for "inetrvals" read -- intervals --; column 8, line 25, for "corerspondence" read -- correspondence --.

Signed and sealed this 8th day of May 1962.

(SEAL)
Attest:

ERNEST W. SWIDER
Attesting Officer

DAVID L. LADD
Commissioner of Patents